Figure 1:
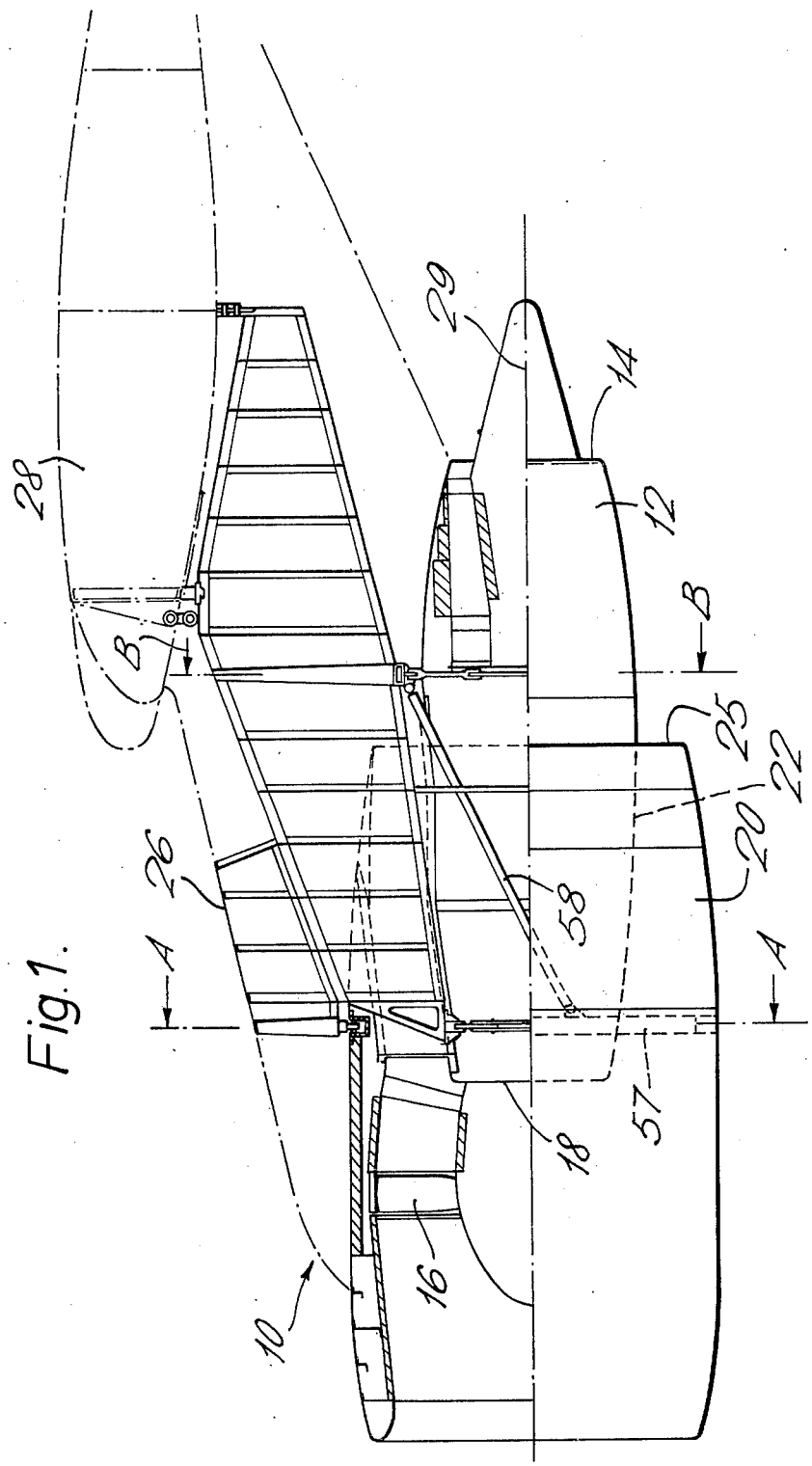

United States Patent [19]

Nightingale

[11] 4,013,246

[45] Mar. 22, 1977

[54] MOUNTING BYPASS GAS TURBINES ENGINES ON AIRCRAFT

[75] Inventor: Douglas John Nightingale, Bristol, England

[73] Assignee: Rolls-Royce (1971) Limited, Great Britain

[22] Filed: Dec. 12, 1975

[21] Appl. No.: 640,158

[30] Foreign Application Priority Data

Dec. 24, 1974 United Kingdom ............ 55768/74

[52] U.S. Cl. ..................................... 244/54; 248/5
[51] Int. Cl.² ........................................ B64D 27/16
[58] Field of Search ................... 244/53, 54; 248/5; 416/18 A; 60/39.31, 39.32, 262, 263, 226 R

[56] References Cited

UNITED STATES PATENTS

| | | |
|---|---|---|
| 3,042,349 | 7/1962 | Pirtle et al. ............................. 248/5 |
| 3,352,114 | 11/1967 | Wilde et al. .......................... 244/54 |
| 3,397,855 | 8/1968 | Newland .............................. 244/54 |
| 3,675,418 | 7/1972 | Lenkeit et al. ....................... 244/54 |
| 3,750,983 | 8/1973 | Morris ................................. 244/54 |
| 3,837,602 | 9/1974 | Mullins ................................ 244/54 |
| 3,848,832 | 11/1974 | Stanley et al. ....................... 244/54 |

FOREIGN PATENTS OR APPLICATIONS

| | | | |
|---|---|---|---|
| 967,640 | 11/1950 | France ............................. 60/39.31 |
| 1,236,917 | 6/1971 | United Kingdom ................... 248/5 |

Primary Examiner—Trygve M. Blix
Assistant Examiner—Galen L. Barefoot
Attorney, Agent, or Firm—Stevens, Davis, Miller & Mosher

[57] ABSTRACT

A bypass gas turbine engine is mounted from an aircraft pylon by a mounting arrangement in which the engine outer casing and the core gas generator are mounted independently to the pylon and in which all the connections between the outer casing and the pylon and between the core gas generator and the pylon lie in substantially the same two planes.

6 Claims, 5 Drawing Figures

MOUNTING BYPASS GAS TURBINES ENGINES ON AIRCRAFT

This invention relates to mounting arrangements for mounting bypass gas turbine engines externally on aircraft.

Bypass gas turbine engines, including ducted fan engines, have a core gas generator, also known as a core engine, which is spaced from an outer engine casing to define, with the casing of the core gas generator, a bypass passage, down which flows air compressed by a compressor or fan driven by the gas generator.

As bypass ratios have become larger in modern gas turbine engines, the core gas generator has become relatively small in comparison with the diameter of the engine outer casing. This is particularly so in relation to those engines known as ducted fan engines.

In conventional mountings for bypass engines either the core gas generator has been mounted from aircraft structure and the outer casing has been supported from the gas generator, or, the engine outer casing has been mounted from aircraft structure and the core gas generator has been supported from the outer casing.

The means of support in either case have been vanes which extended across the bypass passage between the two casings. Now, however, new engine designs are being proposed which have bypass ratios of up to 10 or even higher so that the difference in diameters between the outer casing and the core gas generator are such that any such support vanes would have a high aspect ratio and would have to be extremely thick and heavy to provide the necessary support. Further, the outer casing would be so big that the inertia loads and g-loads on it would be so high that the casing of the core gas generator would have to be so stiff to support the outer casing that the weight penalty would be unacceptable.

It has been proposed in a ducted fan gas turbine engine to mount the fan cowling, which constitutes the outer casing of the bypass passage, and the core gas generator separately on the aircraft, but this has led to further problems arising from relative movements between the core gas generator and the fan cowling, particularly in cases where the engine is mounted on a pylon.

An object of the present invention is to provide a mounting arrangement for a bypass gas turbine engine in an aircraft in which the outer casing of the engine and the core gas generator are mounted separately from aircraft structure and in which the possibility of relative movement between the core gas generator and the engine outer casing is significantly reduced.

It is to be understood that the structure for externally mounting the engine includes pylons, fins or stub wings for mounting the engine above or below the aircraft wing or fuselage or to the side of the aircraft fuselage.

According to the present invention, an aircraft includes structure for externally mounting an engine, a bypass gas turbine engine which comprises an engine outer casing and a core gas generator having an outer casing which is spaced from the engine outer casing to define a bypass passage, front and rear core mounting means for supporting the core gas generator from said structure at two planes transverse to, and spaced apart along the engine axis, and first and second casing mountings for supporting the engine outer casing from said structure independently of the core gas generator, wherein the first casing mounting is disposed in the region of a first one of said two planes and the second casing mounting includes means connected to the engine outer casing in the same plane as the first casing mounting and to aircraft structure in the region of the second one of said two planes.

Preferably the first and second casing mountings are connected to aircraft structure and the engine outer casing in the two planes of the core mounting means.

The engine outer casing preferably includes a stiff mounting ring to which the first and second casing mountings are connected, the connections of the second mounting being made on opposite sides of a radial line through the first mounting.

With the engine mounting arrangement of the present invention, virtually any bending or twisting movements of the aircraft structure results in similar movements of both the core gas generator and the bypass duct wall, and relative movements between the two are substantially reduced or eliminated.

In one particular embodiment of the invention, the bypass engine is a ducted fan engine and the bypass duct outer wall is defined by the fan cowling which constitutes the engine outer casing.

Figure 2:
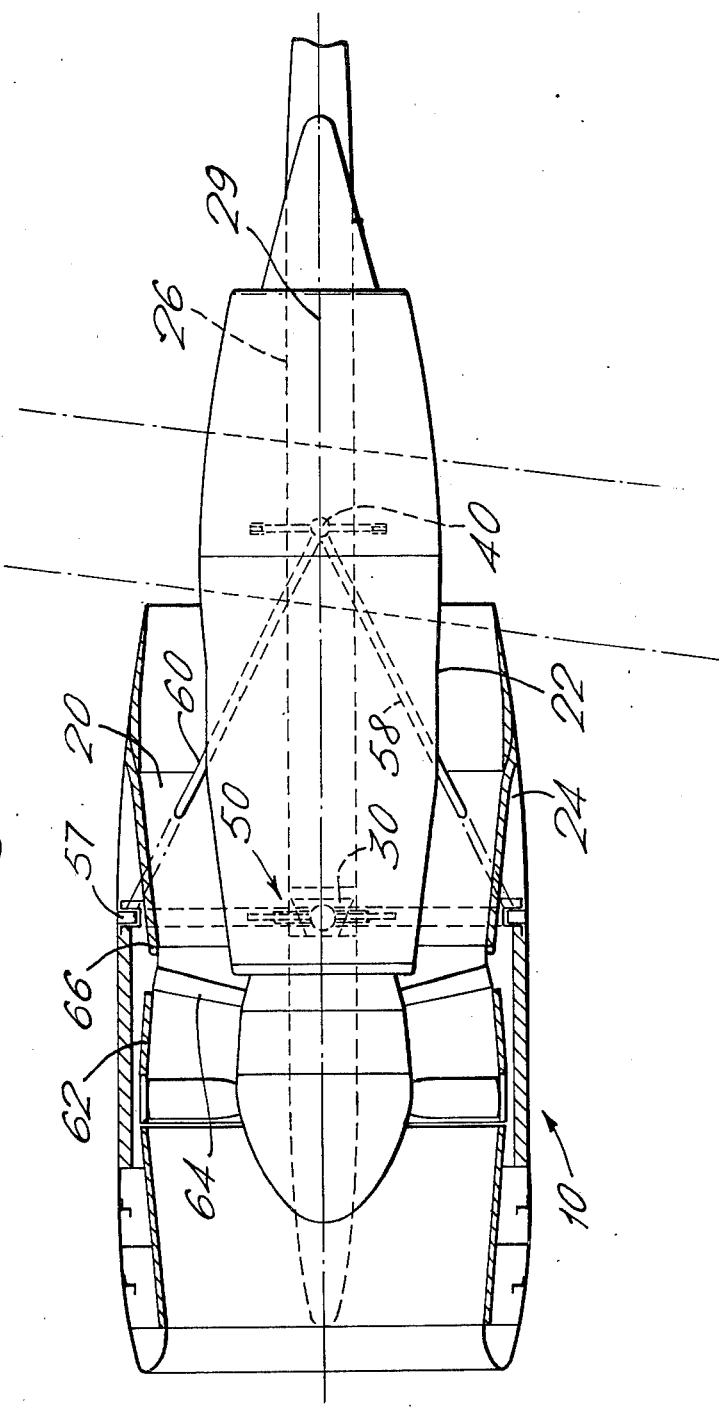
Figure 3:
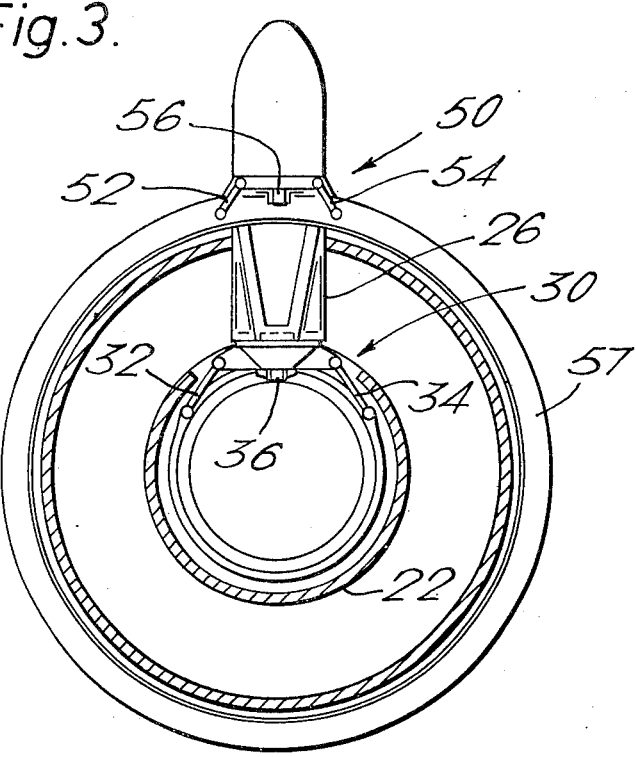
Figure 4:
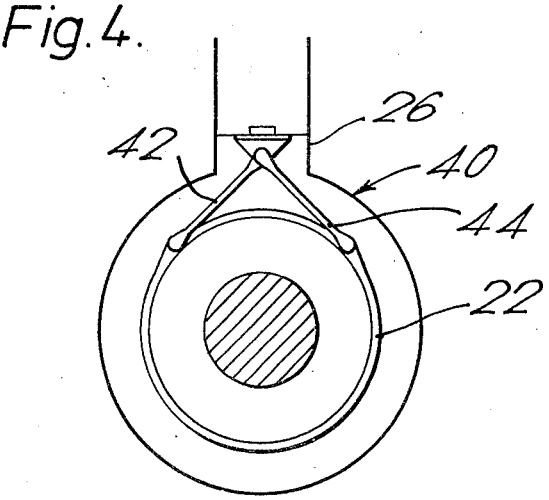
Figure 5:
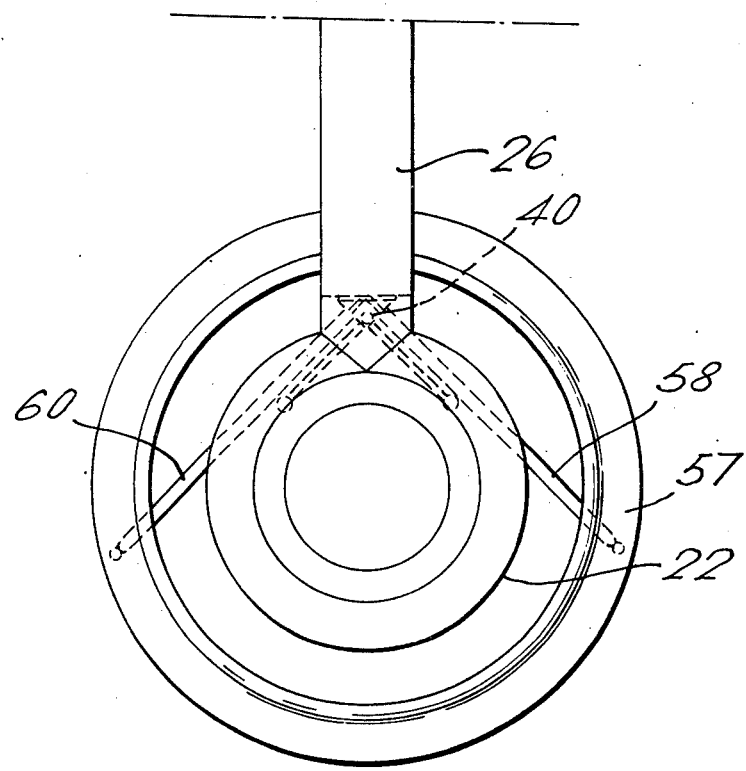

An example of the invention will now be more particularly described with reference to the accompanying drawings, in which:

FIG. 1 is a crossectional view of a ducted fan gas turbine engine mounted from an aircraft wing with a mounting arrangement in accordance with the present invention, FIG. 2 is a plan view of the engine of FIG. 1, FIG. 3 is a section on the line A-A of FIG. 1, FIG. 4 is a section on the line B-B of FIG. 1, and FIG. 5 is an end elevation of FIG. 1 looking forwards.

Referring now to the drawings, there is shown a ducted fan gas turbine engine 10 which has a core gas generator 12 adapted to produce thrust from a propulsion nozzle 14 and to drive a fan 16 mounted on the front of the gas generator. The fan 16 produces a flow of air, part of which is fed to the compressor intake 18 of the core gas generator 12, and part of which flows through an annular bypass duct 20 formed between the outer casing 22 of the gas generator and a fan cowling 24, and passes to atmosphere through a second propulsion nozzle 25. The fan cowling defines the outer wall of the bypass duct 20 and constitutes the outer casing of the engine.

The engine is mounted from a pylon 26 which extends fowardly from beneath the wing 28 of the aircraft, and the pylon is a conventional girder framework.

Both the core gas generator 12 and the fan cowling 24 are mounted from the pylon 26 independently, and all the connections between the cowling 24 and the pylon, and between the core gas generator 12 and the pylon are made in two planes transverse to, and spaced apart along, the engine axis 29.

The core gas generator mountings are conventional as can be seen in FIG. 3 and 4. The front mounting indicated generally at 30 comprises a pair of links 32 and 34 together with a thrust spigot 36 at the top of the casing 22. The links are tangential to the casing 22. Together the links 32, 34 and the spigot 36 take the thrust, side vertical and torsional loads on the core gas generator.

The rear mounting indicated generally at 40 comprises a pair of pin jointed links 42, 44 extending tangentially of the casing 22 and connected to the pylon 26 to assist the front mounting in supporting the vertical and side loads on the core gas generator.

The first cowl mounting, shown generally at 50, is similar to the front core gas generator mounting 30 in that it comprises a pair of pin jointed links 52, 54 and a thrust spigot 56. The links 52 and 54 are connected to a stiff mounting ring 57 in the cowl which lies in the same plane as the core gas generator front mounting 30, and are also connected directly to the pylon 26 at the top of the cowl.

The second cowl mounting comprises a pair of struts 58, 60 which are each connected by universal joints to either side of the ring 57 below the engine axis at one end, and to the rear core mounting 40 at their other ends.

It can be seen therefore that relative movements between the core gas generator and the fan cowl are minimized. For example, all the gas generator and cowl thrusts are taken out into the pylon in the same plane at the front core mounting so there is no differential axial movement between the two. All the torsional loads are also reacted at the same front plane and relative rotation of the core gas generator and cowl are minimized, although there must still be some relative rotation due to the necessary vertical separation of the core and cowl mountings. Yaw and pitching moments of the core and cowl which cause bending and twisting of the pylon are reacted at the same focal points on the pylon structure thus eliminating any coupling effects.

In order to further minimize any deleterious effects of residual relative movements between the core gas generator and the fan cowling on the fan efficiency and tip clearance, the cowl is constructed in two parts. Within the main cowl structure is a smaller cowl 62 which is carried by guide vanes 64 downstream of the fan. This small cowl 62 extends forwardly from the guide vanes over the tips of the fan blades, so that it will move with the guide vanes, which are attached to the core gas generator, and maintain constant tip clearance around the fan blade tips. A seal 66 is provided at the downstream junction of the cowl 62 with the main cowling structure (i.e. close to the cowl mounting plane) where any relative movements will be least, but the upstream end of the cowl 62 is spaced from the main cowling structure to prevent pressurisation of the interior of the main cowling structure.

A further important preferred feature of the present mounting arrangement is that the two struts 58, 60 are connected to the cowling mounting ring 57 below the center-line of the engine. As can be seen from FIG. 5 this provides the cowling with three circumferentially spaced mounting points all in the same plane, one above the engine center line and two below the engine center line.

This gives the opportunity to minimize bending forces in the pylon due to reverse thrust loads, in an engine in which the fan thrust is reversed by blocker doors at the downstream end of the fan duct. The struts put compressive loads from the cowling into the lower booms of the pylon which to some extent offset the tensile loads applied to the lower booms from the core gas generator.

A further advantage of connecting the struts 58 to the cowling below the engine center line is that due to the rearward inclination of the struts, the yawing moment on the cowling produced when the pylon is twisted is minimised.

The invention is not restricted in application to ducted fan engines since all bypass engines could embody the principle of separate mountings for the outer casing and the core engine. The greatest benefits are to be obtained however for engines with bypass ratios greater than about 7 or 8, which at present are all ducted fan gas turbine engines.

The mounting arrangement of the present invention is applicable to all forms of externally mounted engines whether mounted on pylons above or below the aircraft wings, or on stub wings or pylons on the sides or above the fuselage.

Further, any form of mounting may be used in place of the links and thrust spigots described. For example the connection of the outer casing ring to the pylon at the top of the ring may be simply achieved by direct bolting of the ring to the pylon.

The fan cowling may be provided with translatable parts for opening auxiliary intakes, nozzles or thrust reverse appertures, which may necessitate the cowling being made in more than two parts, with the main cowling structure itself being split in a transverse plane and the two parts being joined together at the mounting ring.

Clearly it may not be possible to arrange for the mountings of the cowling and the core gas generator to be in exactly the same plane and slight axial offsets between the plane of the cowling mountings and the core mountings are intended to be included in the invention.

I claim:

1. An aircraft including structure for externally mounting an engine, a by-pass gas turbine engine having a longitudinal axis and which comprises an engine outer cowling and a core gas generator having an outer casing which is spaced from the engine outer cowling to define a by-pass passage, front and rear core mounting means for supporting the core gas generator from said structure and including connections on the core gas generator and on the structure which connections lie in two planes transverse to and spaced along the engine axis, and first and second cowling mounting means for supporting the engine outer cowling from the fixed structure independently of the core gas generator, said cowling mounting means including connections on the engine outer cowling and on the structure, which connections lie in the same two planes as the core engine mounting connections.

2. An aircraft according to claim 1 wherein all of said conenctions on said structure lie substantially in the same plane, which plane lies in the general direction of the longitudinal axis of the engine.

3. An aircraft as claimed in claim 1 and in which the engine outer cowling includes a stiff mounting ring to which the first and second cowling mountings are connected, the connections of the second cowling mounting being made on the ring on opposite sides of a radial line through the first cowling mounting.

4. An aircraft as claimed in claim 1 and in which the engine is a ducted fan gas turbine engine having a main fan cowlng which constitutes the engine outer cowling and wherein a small fan cowling is supported from and is a part of the core gas generator by means of vanes downstream of the fan and which extend across the bypass passage, said small fan cowling extending forwardly from the vanes to surround the tips of the fan blades.

5. An aircraft as claimed in claim 4 and in which the first cowling mounting comprises a pair of elongate links pin-jointed to the main fan cowling and to a pylon, which comprises a part of the aircraft structure, at their respective opposite ends together with a thrust spigot and the second cowling mounting comprises a pair of struts having universal joints at each end and each connected at one end to points on the cowling mounting ring on opposite sides of radial line through the first cowling mounting and at their other ends to the rear core mounting means.

6. An aircraft according to claim 5 and in which the points on the cowling mounting ring to which the struts are connected lie on the opposite side of the engine axis to the first cowling mounting.

* * * * *